(12) United States Patent
Morel et al.

(10) Patent No.: US 8,253,825 B2
(45) Date of Patent: Aug. 28, 2012

(54) IMAGE DATA PROCESSING METHOD BY REDUCING IMAGE NOISE, AND CAMERA INTEGRATING MEANS FOR IMPLEMENTING SAID METHOD

(75) Inventors: Jean-Michel Morel, Paris (FR); Bartomeu Coll, Baleares (ES); Antonio Buades, Buger (ES)

(73) Assignees: France/Ecole Normale Superieure de Cachan, Cachan Cedex (FR); France and Universitat de les Illes Balears, Palma, Baleares (ES); Centre National de la Recherche Scientifique-CNRS, Paris Cedex (FR)

( * ) Notice: Subject to any disclaimer, the term of this patent is extended or adjusted under 35 U.S.C. 154(b) by 983 days.

(21) Appl. No.: 11/579,380

(22) PCT Filed: Apr. 13, 2005

(86) PCT No.: PCT/FR2005/000897
§ 371 (c)(1),
(2), (4) Date: Oct. 28, 2009

(87) PCT Pub. No.: WO2005/122086
PCT Pub. Date: Dec. 22, 2005

(65) Prior Publication Data
US 2010/0141804 A1    Jun. 10, 2010

(30) Foreign Application Priority Data

May 5, 2004    (FR) ....................................... 0404837

(51) Int. Cl.
*H04N 5/217*    (2006.01)
*H04N 9/64*    (2006.01)
(52) U.S. Cl. ........................................ 348/241; 348/249

(58) Field of Classification Search .......... 348/241–254, 348/207.99; 382/209, 219–220, 272; 358/3.26, 358/3.27, 463
See application file for complete search history.

(56) References Cited

U.S. PATENT DOCUMENTS
5,461,491 A    10/1995    Degi
(Continued)

FOREIGN PATENT DOCUMENTS
GB    2 341 030    3/2000
(Continued)

OTHER PUBLICATIONS

Amano et al., "Image Interpolation Using BPLP Method on the Eigenspace," Systems and Computers in Japan, vol. 38, No. 1, 2007.

(Continued)

*Primary Examiner* — Lin Ye
*Assistant Examiner* — Euel Cowan
(74) *Attorney, Agent, or Firm* — Baker Donelson Bearman, Caldwell & Berkowitz, PC

(57) ABSTRACT

The invention concerns image data processing, through noise reduction comprising the following steps: associating a learning zone (ZA) with a reference point (Pref) of the image (IM); for each variable point (PC, PC',) of the learning zone, evaluating a distance (d, d',) between: values of points in a first window (f1) of the image, centered on the reference point, and values of points in a second window (f2, f'2,), of similar format as the format of the first window and centered on the variable point; repeating said distance calculation for all the points of the learning zone as successive variable points and estimating an average value to assign to the reference point, said average being weighted on the basis of the distances evaluated for each variable point.

19 Claims, 3 Drawing Sheets

U.S. PATENT DOCUMENTS

Figure 1:
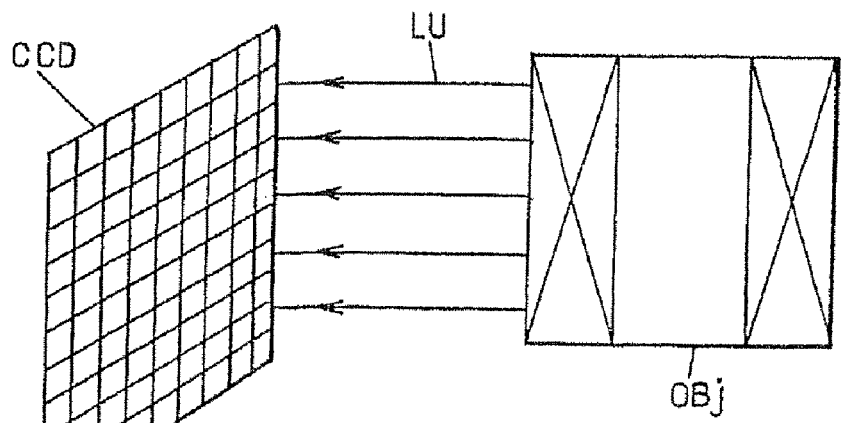
Figure 1:
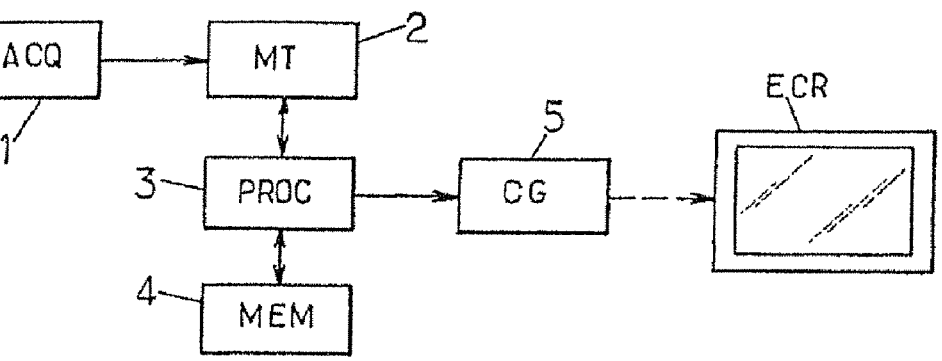

| | | | |
|---|---|---|---|
| 5,825,423 A | | 10/1998 | Jung |
| 6,314,211 B1 * | | 11/2001 | Kim et al. ............... 382/285 |
| 7,639,741 B1 * | | 12/2009 | Holt et al. ............ 375/240.08 |
| 2002/0154820 A1 * | | 10/2002 | Kaneko et al. .......... 382/209 |

FOREIGN PATENT DOCUMENTS

| | | |
|---|---|---|
| JP | 7-135662 | 5/1995 |
| JP | 2000-78583 | 3/2000 |
| JP | 2001-94791 | 4/2001 |
| JP | 2008-46746 | 2/2008 |
| WO | 02/86821 | 4/2001 |

OTHER PUBLICATIONS

Japanese Office Action Mailed March 23, 2011 Based on Japanese Patent Application No. 2007-512244 (6 Pages); With English Language Translation (6 Pages).

Efros et al.: Texture Synthesis by Non-Parametric Sampling; Proceedings of the Seventh IEE International Conference on Computer Vision, vol. 2, 1999, pp. 1033-1038, XP000883732; IEE Comput. Soc Los Alamitos, CA, USA; ISBN: 0-7695-0164-8; section 2.1.

Ordentlich et al.: A Discrete Universal Denoiser and its Application To Binary Images; Proceedings 2003 International Conference on Image Processing, ICIP-2003, Barcelonia, Spain, Sep. 14-17, 2003, vol. 2, Sep. 14, 2003, pp. 117-120, XP010670520; IEEE, USA ISBN: 0-7803-7750-8, sections 5 and 6.

Ozkan et al: Adaptive Motion-Compensated Filtering of Noisy Image Sequences; IEEE Transactions on Circuits and Systems for Video Technology, IEEE Inc. New York, US; vol. 3, No. 4, Aug. 1, 1993, pp. 277-290, XP000414654; ISSN: 1051-8215; the whole document.

Scher et al: Some New Image Smoothing Techniques; IEEE Transactions on Systems, Man, and Cybernetics, IEEE, New York, NY, US, vol. 10, No. 1, Mar. 1980, pp. 153-158, XP0008037149 ISSN: 0018-9472 section IV, 31 3eme paragraphe.

Taguchi et al.: A synthesis of the Optimal Fuzzy Filters for Image Smoothing; CA, USA, Proceedings of the Spie—The International Society for Optical Engineering USA, vol. 2424, Feb. 6, 1995, pp. 210-216, XP008040706; ISSN 2077-786X section 2.

Yining Deng et al.: Peer Group Filtering and Perceptual Color Image Quantization; Circuits and Systems, 1999. ISCAS '99. Proceedings of the 1999 IEEE International Symposium on Orland, FL, USA May 30, Jun. 2, 1999, Piscataway, NJ, USA, IEEE, US, May 30, 1999, pp. 21-24, ISBN: 0-7803-5471-0; the whole document.

Shaffter et al.: Correlative Averaging for Radial Magnetic Resonance Imaging; Philips ournal of Research; Elsevier Amsterdam, NL, vol. 51, No. 2, 1998, pp. 269-281, X004126963; ISSN: 0165-5817; the whole document.

* cited by examiner

IMAGE DATA PROCESSING METHOD BY REDUCING IMAGE NOISE, AND CAMERA INTEGRATING MEANS FOR IMPLEMENTING SAID METHOD

The present invention relates to the processing of image data by reducing noise.

It may be applied to photography for the public at large, to digital video, to medical imaging, or to any new image acquisition system. It is also indicated that the invention may be applied, advantageously to the restoration of films.

Especially with the success of digital cameras with the public at large, the need to restore digital images taken en masse under often unfavorable conditions has recently appeared. However, these images may exhibit noise, be it due to the unfavorable picture-taking conditions or to digital restoration operations.

The existing, known, methods of restoration are not industrially applicable because they depend on parameter settings requiring very accurate knowledge of the nature of the noise, in particular. Moreover, these methods all introduce unacceptable degradations, called artifacts, such as blur, oscillations, stair casing, losses of detail and textures. This is why, at the moment, a high signal-to-noise ratio, typically equivalent to a factor of 100 at least, is necessary in digital cameras. Under-exposed images have a low signal-to-noise ratio and cannot be restored with currently known techniques.

Once digitized, an image takes the form of a generally rectangular array of values. In the case of a time sequence of images, such as a film, there is a series of such arrays, over time.

The association of a point in the array and of the gray level (for a black and white image) or of color levels (typically red, blue and green for a color image), at this point is called:
 a "pixel" for a bidimensional image, and
 a "voxel" for a tridimensional image (in particular in medical imaging).

We shall also speak of a "temporal pixel" for a point belonging to a sequence of images over time, for example, a point which evolves from one image to another in a film. It will then be understood that a time coordinate, additional with respect to a conventional pixel, will then be associated with a "temporal pixel". In the case of a monodimensional image, that is to say a signal, one speaks of a sample for the association of a point and of its value.

Each point is the result of a measurement, generally made by a matrix or a strip of light sensors such as CCDs (standing for "Couple Charge Devices"). A point corresponds to a small square of the CCD matrix, within which the number of photons arriving is counted. The arrival of the photons follows a random process introducing fluctuations about a mean value. Moreover, each sensor may itself produce "dark noise" which gets superimposed on the photon count.

Most images therefore contain noise, which is a random perturbation of the value of the point. Stated otherwise, the image observed, denoted I, follows a relation of the type I=I0+b, where I0 is the ideal image, with no noise, and b the noise.

The images obtained by other methods, like photosensitive paper printing, also exhibit noise due to the chemical characteristics of the backing used. This noise is of course retained during the digitization of the photograph (or "scanning"). The printing of films for cameras also leads to the appearance of small blotches that are also called noise, here.

The noise may depend, at each point on the gray level of this point. Thus, there is in general more noise in the bright parts of the image, even if the signal-to-noise ratio is better there.

We also define what is understood by "signal/noise ratio", here. This parameter designates the proportion of a gray level or color level which may originate from noise. For example, a signal/noise ratio of 100 corresponds to fluctuations of a hundredth of the "true value" of the gray level. For standard digital images, the gray level or color level is between 0 (black) and 255 (white). Noise becomes sensible once it exceeds a mean amplitude, or standard deviation, of 4 or 5, this corresponding to a signal/noise ratio of about 50. It is very useful to be able to eliminate all kinds of noise from images, since noise is a hindrance to the viewing of the images and masks some of the details. Typically, an image with no noise appears sharper.

The size of the CCD sensors is, itself, dictated in part by the requirement for noise reduction. If one knew how to remove noise effectively, it would be possible to construct smaller sensors by applying noise reduction processing to the signals sensed. It would thus be possible to construct smaller cameras, with fewer CCD sensors, but providing the same number of pixels as the existing cameras. It would also be possible to design cameras with the same characteristics, but with higher resolution or else identical cameras but usable with a shorter exposure time.

Finally, many restoration operations on digital images amplify the noise and therefore require to be coupled with de-noising processing. The operations increasing the contrast of under-exposed images amplify the noise. Likewise, the operations removing blur from an image contribute to an increase in the noise.

Unfortunately, the known de-noising algorithms tend to confuse the noise with small details of the image. For example, the noise reduction methods described in particular in documents U.S. Pat. No. 6,681,054 and U.S. Pat. No. 6,539,125 use a weighting based on the spatial distances between a point to be processed and current points surrounding this point to be processed, to calculate a mean to be assigned to the values of the point to be processed. Consequently, if locally the image exhibits a great variety of shades, after noise reduction processing based on a weighting with respect to a spatial distance, this variety of shades is no longer to be found.

Such methods destroy the image in part. The gain in image quality is therefore doubtful.

The present invention comes to improve the situation.

For this purpose it proposes a method of processing image data, by reducing image noise, comprising the following steps:
 a) obtaining points of the image with respective values associated with the points,
 b) associating a learning zone with a reference point of the image, and
 c) and assigning the reference point new values obtained by a weighted statistical estimation, of weighted mean or weighted median type using the values of the points included in the learning zone.

The method within the meaning of the invention comprises more precisely the following steps:
 c1) for each current point of the learning zone, evaluating a distance characterizing a resemblance between
  the values of the points in a first window of the image, centered on the reference point, on the one hand and the values of the points in a second window, of the same format as the first window and centered on the current point, on the other hand, c2) and repeating step c1) for all the points of the learning zone in the guise of successive current points by using the distances obtained for all the current points to calculate the weights used in the weighted statistical estimation of step c).

Preferably, step c) is applied to all the points of the image in the guise of successive reference points, so as to globally process the entire image.

It is also indicated that the learning zone may correspond to the whole of the image. However, in an advantageous variant, the learning zone belongs to one or more model images, different from the image to be processed.

As indicated previously, the points may be pixels for a bidimensional image, voxels for a tridimensional image, or else temporal pixels when the image to be processed is a film. Finally, for a signal representing a monodimensional image such as a film with a single pixel per image, these points are ultimately successive samples.

As indicated hereinabove, it is now possible to redefine the size of light sensors of a camera or else their exposure time to light, by applying the noise reduction processing within the meaning of the invention.

Thus, in step a) of the method within the meaning of the invention, the points of the image are acquired from one or more light sensors of given area, imposing a predetermined exposure time to light, per unit area, on this or these sensors. It is indicated that, in a general manner, a decrease in the exposure time brings about an increase in the noise.

Advantageously, if the implementation of steps c1), c2) and c) offers a reduction in the noise by a factor K, a reduction, substantially by a factor $K^2$, in the exposure times of the sensor or sensors is authorized so as to operate at substantially constant signal-to-noise ratio.

In a configuration where one operates at constant signal-to-noise ratio, and at constant exposure duration, the number of sensors per unit area may advantageously be increased, so as to increase, substantially by a factor $K^2$, the resolution of the image acquired and processed.

In this regard, the present invention is also aimed at a camera equipped with one or more sensors and comprising means of control of the exposure time of the sensors for the implementation of the method hereinabove. There is advantageously provision to equip this camera with a processing unit, adequately programmed to apply the method of processing within the meaning of the invention to the signals acquired by the sensor or sensors of the camera. More particularly, this processing unit comprises a memory able to store a computer program product comprising instructions for the implementation of all or part of the steps of the method hereinabove.

In this regard, the present invention is also aimed at such a computer program product, intended to be stored in a memory of a processing unit of the aforesaid type, or else on a removable memory medium, such as a CD-ROM or a diskette, intended to cooperate with a reader of the processing unit.

Figure 2:
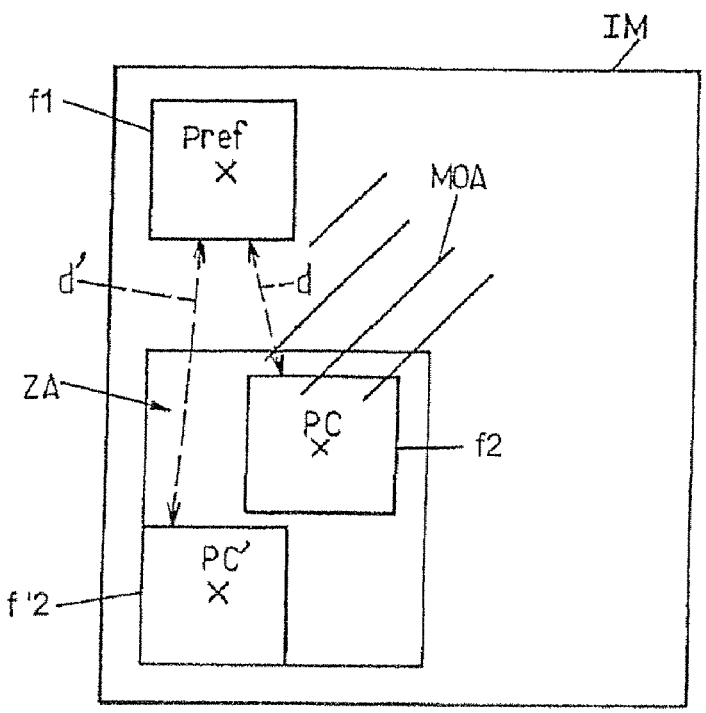
Figure 3:
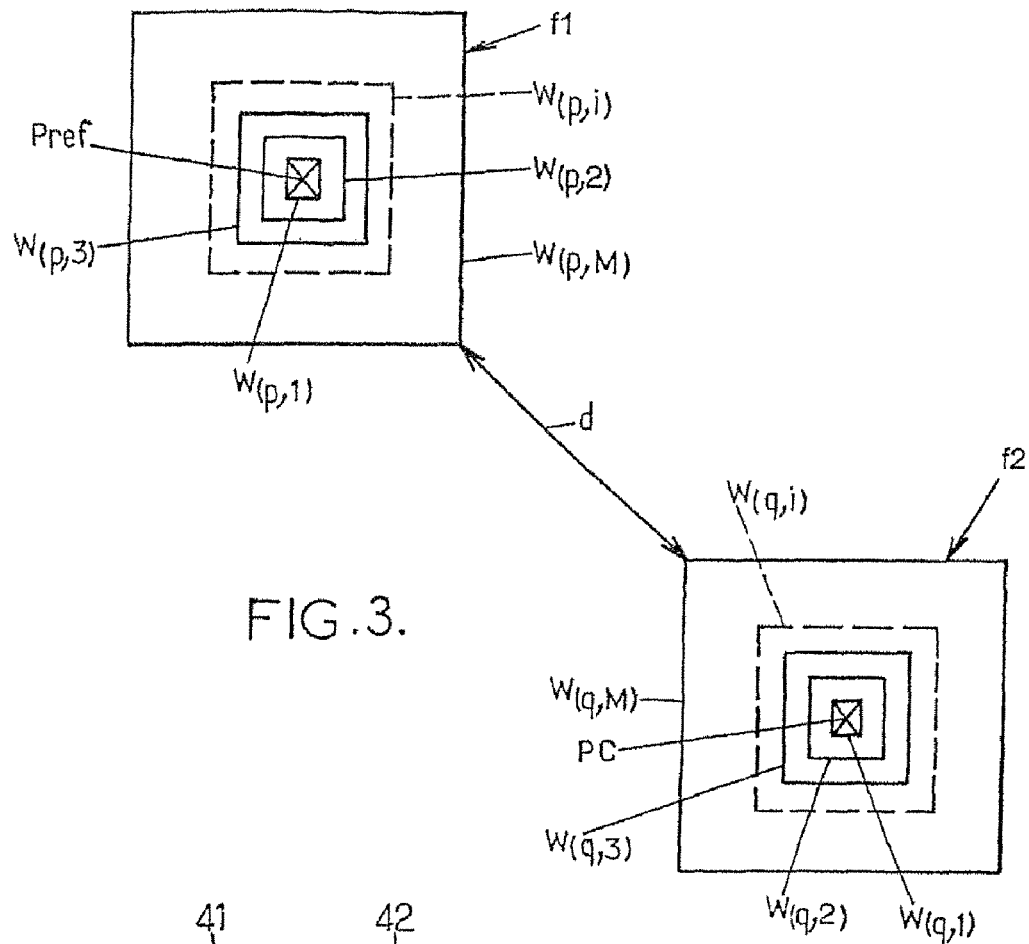
Figure 4:
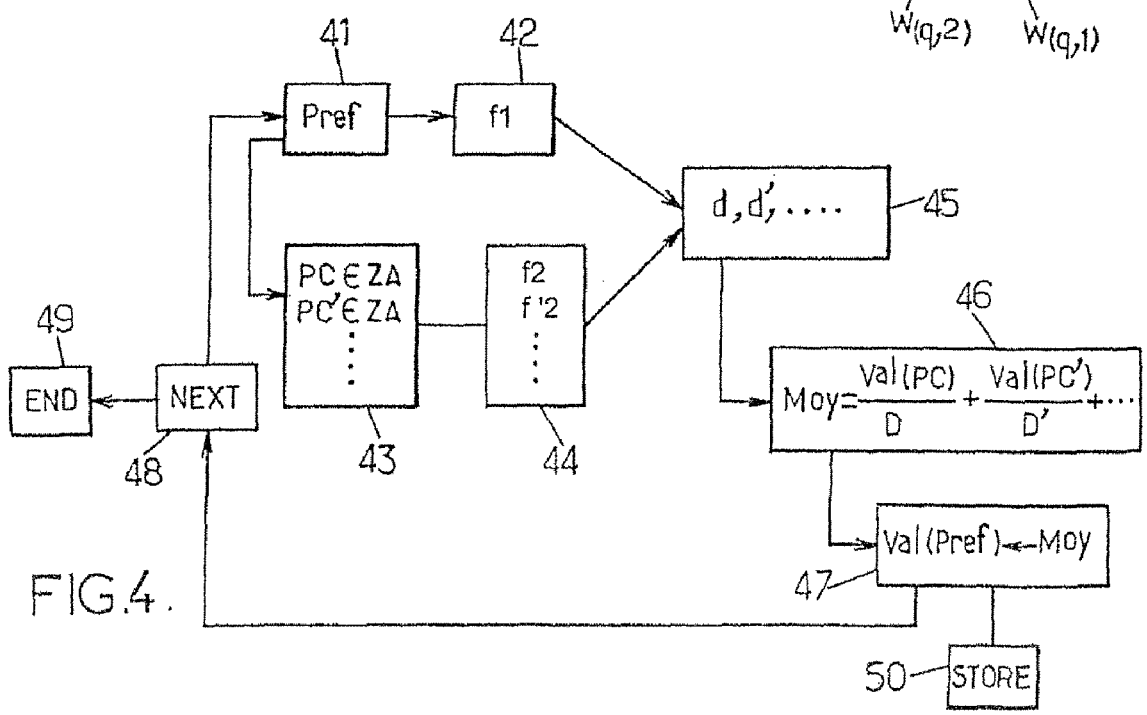
Figure 5:
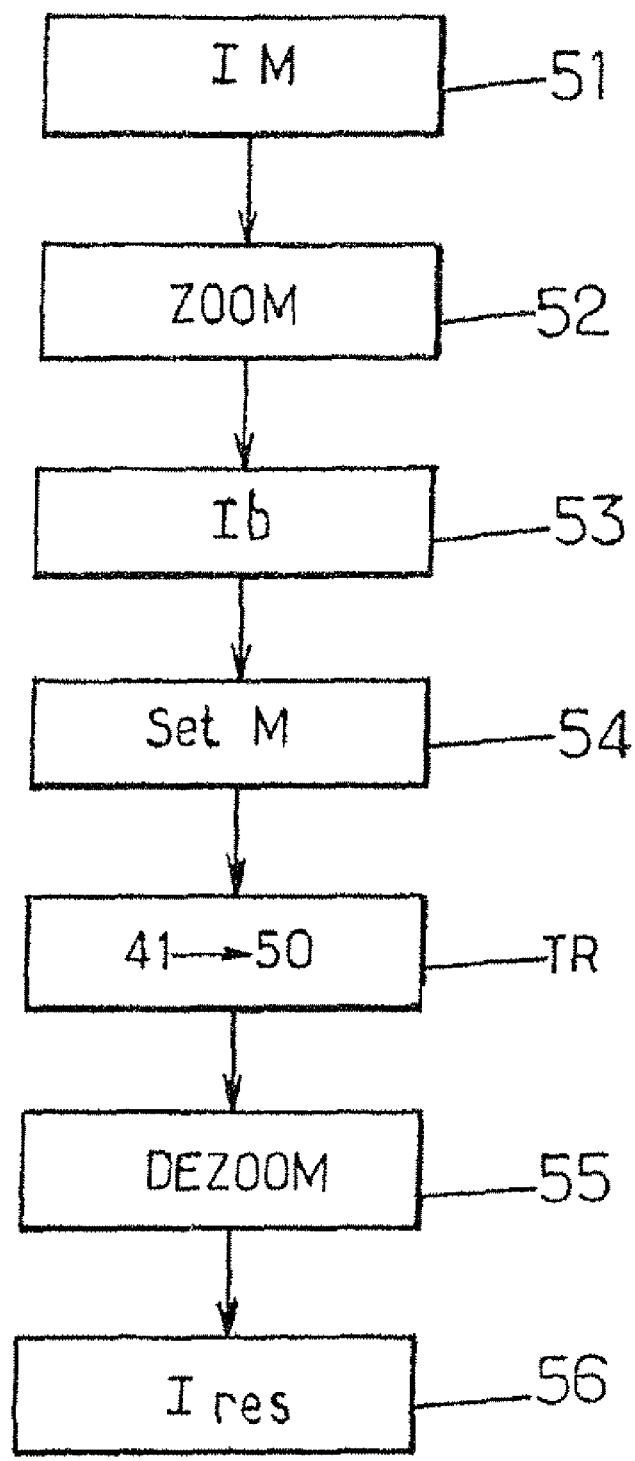

Other advantages and characteristics of the invention will appear on reading the detailed description hereinafter, given by way of nonlimiting example, and on examining the drawings in which:

FIG. 1 illustrates very diagrammatically the elements of a camera entering into the implementation of the processing within the meaning of the invention, FIG. 2 diagrammatically represents the format of the windows to be compared for the evaluation of the distance and, thereby, of the aforesaid weighting, FIG. 3 diagrammatically represents a succession of windows of respective increasing sizes serving for the evaluation of the aforesaid distance, in an embodiment described hereinafter, FIG. 4 summarizes the main steps of the method according to a preferred embodiment, and FIG. 5 represents additional steps of the method hereinabove, in a preferred embodiment.

Referring first of all to FIG. 1, the camera defined hereinabove comprises a matrix of CCD sensors receiving a luminous flux emanating from an object OBJ, the two elements being for example housed in a black box (not represented). It also comprises an acquisition card 1, in particular for converting the signals emanating from the CCD sensors into digital samples, typically pixels, which are stored temporarily in a work memory 2 so as to be processed by a processor 3.

It is recalled that a digital image is made up of pixels which may be likened to points on a grid, furnished with a gray value or with color levels.

A memory 4, for example a read-only memory, stores the instructions of a computer program product for the implementation of the method according to the invention. The pixels processed may, thereafter, be transmitted by an interface 5 which, in the example described, is a graphics interface for the visualization of the image processed by display screen ECR. However, it is indicated that, as a variant, the interface 5 may be a communication interface for transmitting the processed pixels to a remote entity. It may also be an interface to a storage unit, for example for storage on a memory medium, so as to subsequently recover the pixels acquired and processed by the method within the meaning of the invention. Finally, it may be an interface to a unit for printing on paper.

In yet another variant, the samples acquired are transmitted directly to a remote entity comprising a processing unit for applying the noise reduction process within the meaning of the invention to these samples, rather than providing for the processing of the samples at the camera itself.

Hereinafter, the principles of the method within the meaning of the invention are described in broad outline before describing a preferred embodiment thereof.

Referring to FIG. 2, we consider a digital image IM and a pixel Pref. Represented in FIG. 2 is a bidimensional image. One therefore speaks hereinafter of pixel to designate a point of the image. However, as indicated hereinabove, the image may be tridimensional and comprise voxels. The image may also be a film and comprise temporal pixels, without these various distinctions affecting the principles of the invention, as will be seen.

I(Pref) designates the value of the color (or of the gray level for a black and white image) associated with the pixel Pref. This value is either an integer or real number (for a gray levels image) or a triple in the case of color images in the RGB standard (standing for Red-Green-Blue), or else possible an n-tuple in the case of a multispectral image, again without these various distinctions affecting the principles of the invention.

For a degraded image IM, the objective is to suppress the degradations while preserving the principal characteristics of the image, as well as the details of small dimensions and the textures. To achieve this objective, the processing within the meaning of the invention does not make any hypothesis regarding the nature of the noise, nor of the image. A knowledge of the type of noise will, however, make it possible to specify and adapt several elements of the method such as the type of statistical calculation to be performed (weighted mean or weighted median, for example), or else the size to be fixed for the resemblance windows. The processing is nevertheless based on the fact that all the standard images exhibit a high degree of redundancy. It is then considered that around each pixel there are pixels which resemble it very greatly.

The processing may therefore be described in very general terms as follows:
- for each pixel p, of value I(p), we search for the pixels of the image which resemble it most (these pixels which resemble it are denoted p_1, . . . , p_n),
- the initial value I(p) is thereafter replaced by a mean of the values of I(p_1), . . . , I(p_n).

This mean operation reduces the noise. However, the quality of this processing depends on its capacity to find the pixels which most resemble a given pixel.

Most of the known techniques of "de-noising" proceed thus. Typically, those described in documents U.S. Pat. No. 6,681,054 and U.S. Pat. No. 6,539,125, cited hereinabove, replace each value I(p) by a weighted mean of the values of the closest pixels, in terms of spatial distance, assuming that the closest pixels are also the ones that resemble it most.

In the processing within the meaning of the present invention, the requirement of resemblance is favored relative to the criterion of spatial proximity.

Referring to FIG. 2, there are represented a plurality of points PC, PC', . . . belonging to a learning zone ZA which may be situated in the image to be processed IM or sometimes more advantageously, in other images considered as models. Also considered is a reference point Pref to be processed and belonging, for its part, necessarily to the image IM. We construct windows of the same format f1, f2, f'2, . . . respectively about points Pref, PC, PC', . . . . The respective distances d, d', etc. between the windows f1 and f2, and then between the windows f1 and f'2, etc. are evaluated. In the example represented in FIG. 2, the window f2 including the point PC comprises image patterns MOA in the form of oblique stripes, while the windows f1 and f'2 respectively including the reference point Pref and the other current point PC' are both "white". In this case the processing within the meaning of the present invention will allocate a larger distance d to the window f2 than the distance d' which is allocated to the window f'2, even if, nevertheless, the point PC is closer, in distance, to the reference point Pref than the point PC'.

It is indicated that a resemblance between two pixels within the meaning of the present invention, is evaluated as possible:
- consider two pixels Pref and PC, as represented in FIG. 2, we consider a first "resemblance window" f1, for example square, centered on the pixel Pref, and we consider a second window f2 of the same shape, but centered on the pixel PC,
- the pixels Pref and PC are deemed to resemble one another if the windows f1 and f2 resemble one another (the resemblance is measured with respect to a norm which will be specified as a preferred example later).

The set of pixels which are a predetermined distance from the central pixel is called "window centered at a pixel". It is indicated that these windows are preferably square, here. However, their shape may also be rectangular, oval or other.

It is indicated also that, in a general manner, a criterion of distance between windows is established, this distance being evaluated for example on the basis of a weighted sum of squares of the differences of values of points, between the first window and the second window. Any other distance, norm or measure evaluating the resemblance of the two windows is also conceivable.

The resemblance between two windows may be preferably estimated as a function of the sum of the squares of the differences of the gray levels or color levels at each window pixel, as will be seen in detail later.

It will be noted that there is no need to establish a threshold between windows which resemble one another and windows which do not resemble one another. For each resemblance window, a weight is evaluated which varies inversely with the distance d. The weighted mean making it possible to calculate the value assigned to the restored pixel of I(Pref) is therefore a mean where the windows which resemble one another count a lot, while the windows which do not resemble one another count for little or not at all.

Typically, in order for the noise to be divided by a factor of two, it suffices for the number of windows that truly resemble one another to exceed 4, this being practically always the case. The errors introduced by the customary techniques are due particularly to the fact that the resemblance of the pixels whose mean is evaluated is not a parameter that is taken fully into account.

FIG. 4 summarizes these steps. A reference pixel Pref, to be processed, in the image, is designated in step 41. With it is associated a window of predetermined dimension f1, in step 42. It is indicated that in step 43, the designation of the reference pixel to be processed also makes it possible to associate therewith a learning zone ZA and to designate, accordingly the current pixels PC, PC', . . . , belonging to this learning zone ZA and on the basis of which the calculation of the mean will be undertaken.

In step 44, the method continues by constructing second windows f2, f'2, . . . associated with the current pixels PC, PC', etc. In step 45, respective distances d, d', etc. are evaluated according to a criterion of resemblance, between the window f1 and the window f2, between the window f1 and the window f'2, etc.

In step 46, a weighted mean MOY is evaluated as a function of the values of pixels val(PC), val(PC'), . . . of the current points PC, PC', . . . , as well as of the respective distances d, d', . . . calculated in step 45. Typically:

$$MOY = val(PC)/D + val(PC')/D' + \ldots$$

where D, D', . . . are values which vary like the distances d, d', . . . .

In step 47, the value MOY is assigned to the reference pixel Pref and this new value val(Pref) is preferably stored in memory for later display of the image, or other (step 50). In step 48, a test verifies whether there is still another pixel of the image to be processed, in which case this new pixel is designated in the guise of reference pixel in step 41, which is implemented again with the following steps 42 to 50. Otherwise the method stops at step 49.

Specified hereinbelow are the calculations performed at certain steps of the method of FIG. 4, in the guise of exemplary embodiment and nevertheless making it possible to achieve processing efficacy sufficient for the reduction of the noise by a factor 2.

With each pixel p is associated a "learning zone centered at p", ZA, defined as a window A(p, N) of any shape (square, circular, or other), centered at 0 and of fixed size (2N+1)×(2N+1).

The new value $I_{res}(p)$ associated with p may be written as a weighted mean of the values I(q) of the pixels q which belong to the learning zone A(p,N), according to a relation of the type:

$$I_{res}(p) = \sum_{q \in A(p,N)} w(p, q)I(q) \qquad (1)$$

where the weights w(p,q) vary inversely with the distance between the pixels p and q, according to a criterion of resemblance between associated respective windows.

The family of the weights of a learning zone associated with a pixel p is such that:

$$0 \le 2w(p, q) \le 1 \text{ and } \sum_{q \in A(p,N)} w(p, q) = 1$$

To evaluate the similarity between the pixels, we firstly define a "resemblance window centered at the pixel p", denoted W(p,M), centered about the pixel p and of fixed size (2M+1)×(2M+1).

The resemblance between pixels will depend on the resemblance of color values (or of gray levels) between the windows W(p,M) and W(q,M). In the mean expressed in relation (1), the weight w(p,q) is all the larger the more the pixels in W(p,M) and W(q,M) resemble one another. Typically, in the example represented in FIG. 2, the weight W(Pref, PC') is large since the resemblance between the windows f1 and f'2 including respectively Pref and PC' is large. On the other hand, the weight w(Pref, PC) is small since the resemblance windows are different, the window f2 including stripes as indicated hereinabove.

To calculate the resemblance between the windows, we firstly define the distance between W(p,i) and W(q,i) as the Euclidian norm of a difference vector, according to a relation of the type:

$$\|W(p, i) - W(q, i)\| = \frac{1}{2i+1}\sqrt{\sum_{j}[W(p, i)(j) - W(q, i)(j)]^2}, \qquad (2)$$

where
W(p,i)(j) are the $(2i+1)^2$ values of the points of the window of size (2i+1)×(2i+1) and centered on the point p, and
W(q,i)(j) are the $(2i+1)^2$ values of the points of the window of size (2i+1)×(2i+1) and centered on the point q.

Two windows W(p,i) and W(q,i) are said to be "similar" if the norm given above is small.

However, in a preferred embodiment, with reference to FIG. 3, two windows f1 and f2 of the same size (2M+1)×(2M+1) are denoted W(p,M) and W(q,M) are similar if and only if so are their subwindows W(p,i) and W(q,i) of size (2i+1)×(2i+1), with $1 \le i \le M$.

Referring to FIG. 3, the window f1, centered on the reference point Pref, as in FIG. 2, includes a plurality of subwindows (W(p,1), W(p,2), W(p,3), . . . , W(p,i), . . . , W(p,M)) nested within one another, centered on the point Pref and of respective increasing sizes (3×3, 5×5, 7×7, . . . , (2i+1)×(2i+1), . . . , (2M+1)×(2M+1), from W(p,1) to W(p,M).

Likewise, the window f2, centered on the current point PC, as in FIG. 2, includes a plurality of subwindows (W(q,1), W(q,2), W(q,3), . . . , W(q,i), . . . , W(q,M)) nested within one another, centered on the current point PC and of increasing respective sizes (3×3, 5×5, 7×7, . . . , (2i+1)×(2i+1), . . . , (2M+1)×(2M+1)), from W(q,1) to W(q,M). The windows f1 and f2 like the subwindows W(p,i) and W(q,i) (for all the i from 1 to M), are of the same format and, in particular, of the same respective sizes.

We then define the distance between the windows f1 and f2 as a norm referred to here as "generalized" of the difference vector, according to a relation of the type:

$$d[W(p, M); W(q, M)] = \frac{1}{M}\sum_{i=1}^{M}\|W(p, i) - W(q, i)\|, \qquad (3)$$

with $$\|W(p, i) - W(q, i)\| = \frac{1}{2i+1}\sqrt{\sum_{j}[W(p, i)(j) - W(q, i)(j)]^2},$$

as indicated hereinabove.

It is recalled that M is an integer such that (2M+1)×(2M+1) is the size, in number of points, of the windows f1 and f2, denoted W(p,M) and W(q,M).

However, it is indicated that, for a color image in the RGB standard, the aforesaid distance may be evaluated on the basis of the relation:

$$d[W(p, M); W(q, M)] = \frac{1}{M}\sum_{i=1}^{M}\|W(p, i) - W(q, i)\|,$$

but with $$\|W(p, i) - W(q, i)\| = \frac{1}{2i+1}\sqrt{\sum_{j}\sum_{u}[W_u(p, i)(j) - W_u(q, i)(j)]^2},$$

where:
$W_u(p,i)(j)$ are the $(2i+1)^2$ vector values with coordinates u of the points of a current sub-window, of size (2i+1)×(2i+1) included in the first window f1 and centered on the reference point p, and
Wu(q,i)(j) are the $(2i+1)^2$ vector values with coordinates u of the points of a current sub-window, of size (2i+1)×(2i+1), included in the second window f2 and centered on the current point q.

These coordinates u are then respective levels of blue, of red and of green.

In a general manner, the weighting assigned to a current point q decreases with the distance between the values associated with this point q and the values associated with the reference point p.

The weight w(p, q) representing the weighting assigned to a current point q for the estimation of the mean value which will be assigned to the reference point q, is then defined according to a relation of the type:

$$w(p, q) = \frac{1}{Z(p)}\exp(-d[W(p, M); W(q, M)]/h) \qquad (4)$$

where
A(p,N) is the learning zone centered on the reference point p and of size (2N+1)×(2N+1), and
h is a parameter indicative of a degree of filtering of the image.

It is specified here that Z(p) is a constant such that the sum of the weights w(p,q) is equal to 1. Z(p) is therefore defined simply on the basis of the relation:

$$Z(p) = \sum_{q \in A(p,N)} \exp(-d[W(p, M); W(q, M)]/h,) \quad (5)$$

This method therefore involves three parameters, that can be fixed for the digital images adapted to applications for the public at large as follows.

The first parameter is the size of the learning zone $(2N+1) \times (2N+1)$. This zone must be large enough to make it possible to take account of the statistical properties of the image. Trials have shown that the size of the learning zone, in number of points, is preferably greater than $20 \times 20$. Typically, a zone of $21 \times 21$ pixels is sufficient to guarantee suitable learning.

The second parameter is the size of the resemblance window $(2M+1) \times (2M+1)$. Too small a window may lead to too local a comparison. On the other hand, too large a window may have the consequence that no window is truly similar. Here again, trials have shown that the size of the first f1 and second f2 windows is greater than $10 \times 10$ and preferably, greater than or equal to $15 \times 15$. Typically, the size of resemblance windows f1 and f2 of $15 \times 15$ is optimal for Gaussian noise of standard deviation 20. A size of window of $11 \times 11$ already provides very good results. This size is indicated for an image with gray levels. For a color image, the size of the resemblance window may be reduced to $7 \times 7$ and for weak noise down to $3 \times 3$.

The third parameter is the parameter h which indicates the degree of filtering of the image. This parameter is preferably fixed at a value of around 3. However, this value may be chosen smaller if the image is hardly degraded.

It may, however, be that other parameter sets are more judicious for more targeted applications, such as medical imaging or the restoration of films.

The method applied to a bidimensional image with the values of N, M and h hereinabove makes it possible to increase the signal/noise ratio by a ratio greater than 2. This measure may be verified by taking a not very noisy image, and thereafter adding artificial noise to it. The performance of the processing is measured exactly by comparing the mean relative error of the image restored with the noise-free original, as well as the relative error introduced by the noise. We then routinely note a multiplication by a factor of more than 2 of the signal/noise ratio. Thus, for example, CCD sensors that are four times smaller ($2^2$) can be used without increasing noise, as indicated hereinabove. It is indicated elsewhere that the computer program product within the meaning of the invention can be stored in a memory of a photographic development apparatus, of a digital camera, or of a device for restoring digital images, but the application of the invention may also influence the design of the sensors of any new camera or new photographic apparatus by permitting a signal/noise ratio reduced by a factor of larger than four.

However, in a sophisticated embodiment, it is preferred to calculate the standard deviation of the noise present in an image and to fix the optimal size $(2M+1) \times (2M+1)$ of the resemblance windows accordingly. The latter may range from M=1 to M=7, in an image to be processed and to which a prior zoom has been applied, as will be seen later with reference to a preferred embodiment. The size in pixels of the resemblance window therefore varies between $3 \times 3$ and $15 \times 15$ in the zoomed image. The $3 \times 3$ size in a color image with noise with standard deviation of less than or around 13 makes it possible to restore the finest details.

Referring to FIG. 5, the method within the meaning of the invention, or in an advantageous embodiment, comprises the following global steps, after obtaining the raw image IM in step 51:

in step 52, the image to be processed IM is magnified by a digital zoom operation, the processing TR within the meaning of the invention and corresponding preferably to steps 41 to 50 of FIG. 4 is applied, and in step 55, the image processed $I_{res}$ is reduced in the inverse sense by a zoom-out operation, so as to restore the processed image $I_{res}$.

Prior to the processing step proper TR, it is also advantageous, as indicated hereinabove, to estimate a level of noise Ib in the image to be processed (step 53), and adapt the format M, in particular in terms of number of points, of the resemblance windows as a function of the estimated noise level (step 54).

It has turned out in fact that the processing was more efficacious if it is applied after a zoom in accordance with Shannon's sampling theory (zoom by FFT). The position of the resemblance windows becoming more accurate, the restoration of the fine textures is improved.

The processing is more efficacious also if the value of the restored pixels depends not only on the mean of the values of the resemblance windows, but also on the variance of these values, that can be estimated by a method known per se.

Thus, the processing by noise reduction within the meaning of the invention consists globally in replacing the value at each pixel of the image by a weighted mean of all the values of the pixels of the image. The weighting is done in such a way that a window which greatly resembles the window centered at the pixel contributes greatly to the mean, whilst a window that does not resemble it very much hardly contributes thereto. The resemblance between two windows of the same format is evaluated on the basis of a function of the differences of values between respective pixels of the two windows, for example a quadratic mean of these differences, or any other norm, deviation or distance measuring the resemblance of the two windows more finely.

This weighted mean, on account of the redundancies inherent in the images, confirms a good value while reducing the error due to noise by a factor of greater than 2. The method within the meaning of the invention does not presuppose any prior knowledge about the noise or the image.

This method makes it possible to use sensors with internal noise or photon noise that is more than four times greater and to eliminate the noise created by various restoration operations (typically deblurring, extension of the gray scale for under-exposed photographs, or others).

Of course, the present invention is not limited to the embodiment described hereinabove by way of example; it extends to other variants.

In a more general manner, it is indicated that the weighted means may be replaced by other statistical estimators such as median or weighted median according to the type of noise envisaged. It is also indicated that the calculation of the weights in the weighted mean or the weighted median may depend, apart from on the distance based on a resemblance criterion as described hereinabove on other statistical parameters estimated globally in the image and on each resemblance window, such as, for example the variance of each window or the estimated variance of the noise in the image.

Again, in a general manner, the method described hereinabove is suited to an image of arbitrary dimension, either color or black and white, to a film or to a tridimensional image, irrespective of its origin (on cellulose or digital). If the image is initially in nondigital form it is scanned beforehand.

The invention claimed is:

1. A method of processing image data, by reducing image noise, comprising the following steps:
    a) obtaining points of the image with respective values associated with the points,
    b) associating a learning zone, containing a plurality of points, with a reference point of the image,
    c) and assigning the reference point new values obtained by a weighted statistical estimation, of weighted mean or weighted median type using the values of the points included in the learning zone, the method characterized in that it comprises the following steps:
    c1) for each current point of the learning zone, valuating a distance between a window around the reference point and a window around the current point based on a resemblance between
        the values of the points in the reference point window, centered on the reference point, on the one hand and
        the values of the points in the current point window, of the same format as the reference point window and centered on the current point, on the other hand,
    c2) and repeating step c1) for all the points of the learning zone in the guise of successive current points by using the distances obtained for all the current points to calculate the weights used in the weighted statistical estimation of step c)
wherein said distance is evaluated from the relation:

$$d[W(p, M); W(q, M)] = \frac{1}{M}\sum_{i=1}^{M} \|W(p, i) - W(q, i)\|,$$

with $$\|W(p, i) - W(q, i)\| = \frac{1}{2i+1}\sqrt{\sum_{j}\sum_{u}[W_u(p, i)(j) - W_u(q, i)(j)]^2},$$

wherein
M is an integer such that (2M+1)×(2M+1) is the size, in number of points, of the reference point window,
$W_u(p,i)(j)$ are the $(2i+1)^2$ vector values with coordinates u of the points of a current sub-window, of size $(2i+1)\times(2i+1)$ included in the reference point window and centered on the reference point p, and
$W_u(q,i)(j)$ are the $(2i+1)^2$ vector values with coordinates u of the points of a current sub-window of size $(2i+1)\times(2i+1)$, included in the current point window and centered on the current point q, and wherein the steps are carried out by a processing unit.

2. The method as claimed in claim 1, characterized in that step c) is applied to all the points of the image in the guise of successive reference points.

3. The method as claimed in claim 1, characterized in that the learning zone corresponds to the whole of the image.

4. The method as claimed in claim 1, characterized in that the learning zone belongs to one or more model images, different from the image to be processed.

5. The method as claimed in claim 1, characterized in that the points are pixels for a bidimensional image or voxels for a tridimensional image, or else temporal pixels when the image to be processed is a film.

6. The method as claimed in claim 1, characterized in that said distance is evaluated on the basis of a sum of squares of the differences of values of points, between the reference point window and the current point window.

7. The method as claimed in claim 1, in which the image is a color image, characterized in that said coordinates u designate positions of respective levels of blue, of red and of green.

8. The method as claimed in claim 1, characterized in that the weighting assigned to a current point q decreases with the distance between the values associated with this point q and the values associated with the reference point p.

9. The method as claimed in claim 8, characterized in that the weighting assigned to a current point q is given by the relation:

$$w(p, q) = \frac{1}{Z(p)} = \exp(-d[W(p, M); W(q, M)]/h),$$

with:

$$Z(p) = \sum_{q \in A(p,N)} \exp(-d[W(p, M); W(q, M)]/h),$$

where:
A(p,N) is the learning zone centered on the reference point p and of size (2N+1)×(2N+1),
h is a parameter indicative of a degree of filtering of the image.

10. The method as claimed in claim 1, characterized in that the size of the learning zone, in number of points, is greater than 20×20.

11. The method as claimed in claim 10, characterized in that the size of the reference point window and current point window is greater than 10×10 and, preferably, greater than or equal to 15×15 and, in a color image, preferably greater than or equal to 5×5, or even 3×3 for the images which are not very noisy.

12. The method as claimed in claim 10, characterized in that the parameter h has a value of around 3.

13. The method as claimed in claim 1, in which, in step a) the points of the image are acquired from one or more light sensors of given area, by imposing on the sensor(s) a predetermined time of exposure to light, per unit area, a decrease in the exposure time bringing about an increase in the noise, characterized in that, the implementation of steps c1), c2) and c) offering a reduction in the noise by a factor K, a reduction, substantially by a factor $K^2$, in the exposure times of the sensor or sensors is authorized so as to operate at substantially constant signal-to-noise ratio.

14. The method as claimed in claim 13, characterized in that one operates at constant signal-to-noise ratio, and at constant exposure duration, whilst increasing the number of sensors per unit area, so as to increase, substantially by a factor $K^2$, the resolution of the image acquired and processed.

15. The method as claimed in claim 1, characterized in that it comprises prior steps comprising estimating a level of noise in the image to be processed, and adapting the format, in particular in terms of 10 number of points, of said reference point window and current point window as a function of the estimated noise level.

16. The method as claimed in claim 1, characterized in that it comprises the following global steps:
    magnifying the image to be processed by a digital zoom operation,
    applying steps a), b), c1), c2) and c),
    and reducing in the reverse sense the image processed, by a zoom-out operation.

17. A processing unit comprising a non-transitory computer readable medium, storing a program, which when executed causes the processing unit to carry out each step as recited in claim 1.

18. A camera equipped with multiple image sensors and a processor that controls exposure timings of the sensors, wherein the processor reduces image noise by employing the method of claim 1.

19. A method of processing image data, by reducing image noise, comprising the following steps:
   a) obtaining points of the image with respective values associated with the points,
   b) associating a learning zone, containing a plurality of points, with a reference point of the image,
   c) and assigning the reference point new values obtained by a weighted statistical estimation, of weighted mean or weighted median type using the values of the points included in the learning zone, the method characterized in that it comprises the following steps:
   c1) for each current point of the learning zone, valuating a distance between a window around the reference point and a window around the current point based on a resemblance between
      the values of the points in the reference point window, centered on the reference point, on the one hand and
      the values of the points in the current point window, of the same format as the reference point window and centered on the current point, on the other hand,
   c2) and repeating step c1) for all the points of the learning zone in the guise of successive current points by using the distances obtained for all the current points to calculate the weights used in the weighted statistical estimation of step c),
wherein said distance is evaluated from the relation:

$$d[W(p, M); W(q, M)] = \frac{1}{M} \sum_{i=1}^{M} \|W(p, i) - W(q, i)\|,$$

with $$\|W(p, i) - W(q, i)\| = \frac{1}{2i+1} \sqrt{\sum_{j} [W(p, i)(j) - W(q, i)(j)]^2},$$

wherein

M is an integer such that $(2M+1)\times(2M+1)$ is the size, in number of points, of the reference point window, $W(p,i)(j)$ are the $(2i+1)^2$ values of the points of a current sub-window, of size $(2i+1)\times(2i+1)$ included in the reference point window and centered on the reference point p, and $W(q,i)(j)$ are the $(2i+1)^2$ values of the points of a current sub-window, of size $(2i+1)\times(2i+1)$, included in the current point window and centered on the current point q, and wherein the steps are carried out by a processing unit.

\* \* \* \* \*